(12) United States Patent
Linke

(10) Patent No.: US 10,189,193 B2
(45) Date of Patent: Jan. 29, 2019

(54) METHOD FOR THE PRODUCTION OF A FLUID CONTAINER FOR A MOTOR VEHICLE, AND CORRESPONDING FLUID CONTAINER

(71) Applicant: AUDI AG, Ingolstadt (DE)

(72) Inventor: Matthias Linke, Böhmfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/356,005

(22) Filed: Nov. 18, 2016

(65) Prior Publication Data

US 2017/0144342 A1    May 25, 2017

(30) Foreign Application Priority Data

Nov. 21, 2015  (DE) .................. 10 2015 015 122

(51) Int. Cl.

| B29C 45/00 | (2006.01) |
|---|---|
| B29D 22/00 | (2006.01) |
| B60K 15/03 | (2006.01) |
| B29C 45/37 | (2006.01) |
| B29L 31/00 | (2006.01) |
| B29C 33/44 | (2006.01) |

(52) U.S. Cl.
CPC .......... B29C 45/006 (2013.01); B29C 45/37 (2013.01); B29D 22/003 (2013.01); B60K 15/03177 (2013.01); B29C 33/44 (2013.01); B29L 2031/7172 (2013.01); B60K 2015/03032 (2013.01); B60K 2015/03493 (2013.01)

(58) Field of Classification Search
CPC . B29C 45/0062; B29C 45/006; B29D 22/003; B29D 22/00; B60K 15/03177; B60K 15/03; B60K 15/03006; B65D 11/188; B65D 11/24; B65D 11/22; B65D 11/20; B21D 39/00
USPC .......... 220/563, 562, 4.14, 4.13, 4.12, 4.24, 220/4.21, 623, 608, 675, 669; 29/527.1
See application file for complete search history.

(56) References Cited

U.S. PATENT DOCUMENTS

| 2,770,386 A | * | 11/1956 | Mitchell ................ | B65D 11/28 |
| | | | | 220/4.21 |
| 3,653,531 A | * | 4/1972 | Zurmuehlen .......... | B65D 88/10 |
| | | | | 220/4.14 |

(Continued)

FOREIGN PATENT DOCUMENTS

| CN | 105050846 A | 11/2015 |
| DE | 197 03 429 | 8/1998 |

(Continued)

OTHER PUBLICATIONS

Chinese Search Report dated Aug. 15, 2018 with respect to counterpart Chinese patent application 2016108368063.

(Continued)

*Primary Examiner* — Robert J Hicks
(74) *Attorney, Agent, or Firm* — Henry M. Feiereisen LLC

(57) ABSTRACT

In a method of producing a fluid container for a motor vehicle, at least one of at least two shells is injection-molded in a mold with a sidewall and a plurality of projections in spaced-apart relation to one another and to the sidewall. The plurality of projections is hereby injection-molded off-tool. The at least two shells are connected to form the fluid container.

20 Claims, 1 Drawing Sheet

(56) References Cited

U.S. PATENT DOCUMENTS

| | | | | |
|---|---|---|---|---|
| 5,310,070 A * | 5/1994 | Haas | ............... | B65D 21/0234 |
| | | | | 220/4.24 |
| 5,368,467 A * | 11/1994 | Kleyn | ............... | B29C 33/0033 |
| | | | | 249/178 |
| 8,840,976 B2 * | 9/2014 | Larson | ............... | C08G 18/56 |
| | | | | 428/35.7 |
| 2005/0173433 A1 * | 8/2005 | Spahr | ............... | B32B 7/08 |
| | | | | 220/62.22 |
| 2006/0151505 A1 * | 7/2006 | Kobayashi | ............... | B29C 45/14262 |
| | | | | 220/562 |
| 2008/0268763 A1 * | 10/2008 | Dippel | ............... | B60H 1/249 |
| | | | | 454/152 |
| 2011/0147128 A1 | 6/2011 | Schrade et al. | | |
| 2015/0102026 A1 * | 4/2015 | Parola | ............... | B29C 45/1615 |
| | | | | 220/4.01 |
| 2016/0052385 A1 * | 2/2016 | Luhn | ............... | B60K 15/03177 |
| | | | | 220/562 |
| 2016/0193913 A1 * | 7/2016 | Kataoka | ............... | 220/562 |

FOREIGN PATENT DOCUMENTS

| | | | | |
|---|---|---|---|---|
| DE | 10 2009 055 157 | | 6/2011 | |
| DE | 10 2011 100 078 | | 10/2012 | |
| DE | 20 2014 009 942 | | 4/2015 | |
| EP | 2 660 090 | | 11/2013 | |
| JP | 07101240 A | * | 4/1995 | ............ B29C 45/14 |
| JP | 2002-225080 | | 8/2002 | |
| WO | WO 2010/084178 | | 7/2010 | |

OTHER PUBLICATIONS

Translation of Chinese Search Report dated Aug. 15, 2018 with respect to counterpart Chinese patent application 2016108368063.

* cited by examiner

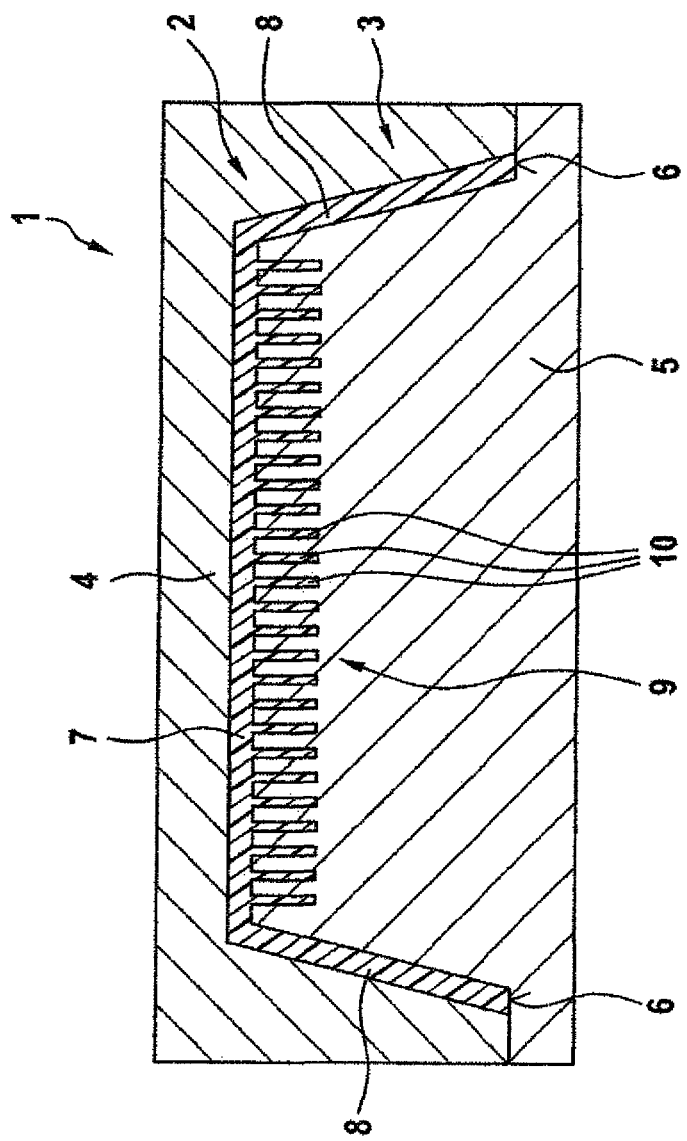

METHOD FOR THE PRODUCTION OF A FLUID CONTAINER FOR A MOTOR VEHICLE, AND CORRESPONDING FLUID CONTAINER

CROSS-REFERENCES TO RELATED APPLICATIONS

This application claims the priority of German Patent Application, Serial No. 10 2015 015 122.3, filed Nov. 21, 2015, pursuant to 35 U.S.C. 119(a)-(d), the disclosure of which is incorporated herein by reference in its entirety as if fully set forth herein.

BACKGROUND OF THE INVENTION

The present invention relates to a method for the production of a fluid container for a motor vehicle, and to a corresponding fluid container.

The following discussion of related art is provided to assist the reader in understanding the advantages of the invention, and is not to be construed as an admission that this related art is prior art to this invention.

A fluid container may, for example, be used as temporary storage of an operating agent for a motor vehicle and assembled from at least two shells. As such, a fluid container can be configured as operating agent tank. Examples of an operating agent include fuel, lubricant, or a reducing agent. A reducing agent as operating agent may be used for emission control. The operating agent is normally liquid, e.g. a urea solution or the like, when the operating agent is a reducing agent. As the motor vehicle travels, accelerations occur in different directions. As a consequence of these accelerations and mass inertia, the operating agent is shifted in the fluid container, causing unwanted noise such as sloshing noises.

To address generation of unwanted noise during travel of the motor vehicle, the provision of damping elements inside the fluid container, i.e. fluid space thereof, has been contemplated. The damping elements may, for example, be secured to at least one of the shells, before the shells are connected to form the fluid container. This requires, however, additional processing steps, such as providing damping elements and securement thereof to at least one shell. In addition, storage costs are increased since damping elements have to be stored in addition to the shells.

It would therefore be desirable and advantageous to provide an improved method for the production of a fluid container in order to obviate prior art shortcomings.

SUMMARY OF THE INVENTION

According to one aspect of the present invention, a method of producing a fluid container for a motor vehicle includes injection molding at least one of at least two shells with a sidewall and a plurality of projections in spaced-apart relation to one another and to the sidewall, with the plurality of projections being injection-molded off-tool, and connecting the at least two shells.

A fluid container according to the present invention includes two shells, both of which can be formed through an injection molding process. The shells are hereby made independently from one another. Once produced, the shells can be put together and fastened to one another, for example by form fit, interference fit and/or material joint. Currently preferred is a connection of the shells by material joint. Advantageously, the shells are made of plastic, suitably of same plastic. When the shells are put together, a fluid space is formed in which the operating agent can be temporarily stored.

To prevent unwanted noise generation during travel of the motor vehicle, provision is made for at least one shell to be provided with projections during injection molding of the shell, i.e. the projections assume the task of damping elements and for this purpose are integrated in the at least one of the shells. The presence of a plurality of projections on the at least one shell is currently preferred, although the presence of a single projection may also be conceivable.

According to another advantageous feature of the present invention, the projections can be formed to directly extend from a bottom of the at least one shell. The projections may thus be formed in one piece with the bottom or molded thereon. Thus, the projections are not distanced from the bottom but formed in one piece therewith and/or of same material therewith.

The projections extend in spaced-apart relation to the sidewall or sidewalls of the fluid container so as to avoid direct contact therewith. There is only an indirect connection via the bottom from which the sidewall or sidewalls extend. The bottom has a side in confronting relationship to the fluid space of the fluid container, which side is at least predominantly flat. The sidewall can extend at an angle to the bottom in a direction toward the other shell.

As the projections are distanced from one another, there is no direct contact between the projections. Advantageously, the projections extend in parallel relationship from the bottom and connected to one another via the bottom. The projections are formed in an off-tool manner during injection molding of the shell. This means that the finished projections "fall" from the mold and thus can be demolded or removed from the mold together with the shell or a base body of the shell, from where the projections extend. The projections are thus formed on the shell in the absence of any undercuts or the like. A parallel arrangement of the projections contributes very effectively to a suppression of unwanted noise.

According to another advantageous feature of the present invention, the projections can be formed at a height which is smaller than a height of the at least one shell. The shell has a certain height as defined substantially by the extent of the sidewall(s) in a direction away from the bottom of the shell. For example, the height of the shell can correspond to its maximum extent in a direction perpendicular to the bottom. The projections have hereby a smaller height than the shell.

It may also be conceivable that the projections have dimensions which in a direction perpendicular to the bottom are smaller than the dimensions of the sidewall(s) in the same direction, in particular smaller than the greatest extent of the sidewall(s) in this direction. For example, the height of the projections in relation to the height of the shell or in relation to the height of the sidewall(s) is at most 10%, at most 20%, at most 30%, at most 40%, or at most 50%. Advantageously, the projections have a same height so that their free ends projecting into the fluid space end flush to one another.

According to another advantageous feature of the present invention, the projections can be formed on several shells, with the projections of one of the shells disposed in spaced-apart relation to the projections of another one of the shells. The projections of the shells may also be in alignment with one another. The spaced-apart disposition of the projections of the one shell from the projections of another shell may be provided in a direction perpendicular to the bottom or parallel to the bottom. When provided in a direction perpendicular to the bottom, the projections of one of the shells are sized to extent shy from the projections of the other one of the shells. When provided in a direction parallel to the bottom, the projections of the shells are not in alignment with one another but rather arranged at an offset in the direction parallel to the bottom.

The projections may also be arranged in alignment so that at least one of the projections of one of the shells defines a longitudinal center axis which coincided with the longitudinal center axis of a projection of another one of the shells. Advantageously, this applies to all projections so that the arrangement of the projections on one shell is identical with the arrangement of the projections on the other shell. This can be realized, for example, by producing the shells in a same injection mold so that the shells are identical.

According to another advantageous feature of the present invention, the projections of one of the shells may engage between the projections of another shell and/or have longitudinal center axes in offset relationship to longitudinal center axes defined by the projections of the other shell. Thus, the projections of the one shell and the projections of the other shell extend in at least one imaginary plane, in particular an imaginary plane which is parallel to the bottom. Advantageously, the projections have hereby center longitudinal axes that are offset to one another so as to establish an engagement of the projections into one another. In such a configuration, the shells are not identical but are produced in different injection molds.

According to another advantageous feature of the present invention, the projections can have a round or polygonal cross section, e.g. rectangular cross section. Of course, any cross section of the projections is basically conceivable. Currently preferred is, however, when the projections have a round or polygonal cross section, i.e. perpendicular to their longitudinal center axes. Projections of round cross sections are especially advantageous to dampen noise. Webs can be formed, when the projections are rectangular in cross section. Projections in the form of webs in one or more shells can extend in parallel relation. In the presence of several shells, provision may be made for webs of different shells to extend at an angle to one another, i.e. not parallel. The angle may hereby be greater than 0° and smaller than 180°. Webs of different shells can extend in directions that are perpendicular to one another, i.e. the angle is 90°.

According to another advantageous feature of the present invention, the projections can be formed as cylinders, e.g. as circular cylinders. Other configurations may be conceivable as well, e.g. as hollow cylinder or circular hollow cylinder. Configuration as cylinder enables simple demolding of the shell from the injection mold so as to realize the off-tool configuration of the projections especially easily. This is true in particular, when the cylinders have a straight longitudinal center axis, in particular a longitudinal center axis which is perpendicular to the bottom.

According to another advantageous feature of the present invention, the sidewall can be formed so as to extend at an angle in relation to the projections. Advantageously, the sidewall has a greater height than the projections and thus has a greater surface area. To facilitate demolding of the shell, the sidewall or sidewalls are angled, in particular in relation to the projections and/or bottom.

For example, at least one of the sidewalls extends in relation to the bottom at an obtuse angle so that the sidewall is not parallel to the projections. Advantageously, this applies to for several of the sidewalls, especially all sidewalls. For example, the sidewall is inclined in relation to an opposing sidewall so as to establish a progressively increasing distance between the sidewalls, as they extend away from the bottom.

According to another aspect of the present invention, a fluid container for a motor vehicle includes at least two shells connected to one another, at least one of the shells having a sidewall and a plurality of projections in spaced-apart relation to one another and to the sidewall, with the plurality of projections being injection-molded in an off-tool manner.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE is a schematic sectional view of part of a fluid container for a motor vehicle during production of a shell of the fluid container by way of injection molding.

DETAILED DESCRIPTION OF PREFERRED EMBODIMENTS

The depicted embodiment is to be understood as illustrative of the invention and not as limiting in any way. It should also be understood that the figure may not necessarily be to scale. In certain instances, details which are not necessary for an understanding of the present invention or which render other details difficult to perceive may have been omitted.

Turning now to the sole FIGURE, there is shown a schematic sectional view of part of a fluid container for a motor vehicle, generally designated by reference numeral 1, during production of a shell 2 of the fluid container 1 by way of injection molding in an injection mold 3. The injection mold 3 is comprised of two parts, i.e. a first half-mold 4 and a second half-mold 5. The shell 2 is formed by arranging the half-molds 4, 5 against one another to define a cavity there between in which injection-molding material, especially plastic, is introduced. After the injection-molding material has cooled down, the half-molds 4, 5 are separated again and the finished shell 2 can be demolded, i.e. removed from the injection mold 3.

The fluid container 1 is comprised of at least two such shells 2 which are joined together at a joint face 6 after their production.

Currently preferred is an identical configuration of the shells 2. Hence, for convenience and sake of simplicity, much of the following description is made only in relation to one shell 2, as illustrated in the Figure. However, it will be understood by persons skilled in the art that a description of one shell 2 is equally applicable to other shells.

The shell 2 has a bottom 7 and sidewalls 8, with the sidewalls 8 extending at an angle in relation to the bottom 7 away from the bottom 7. The joint face 6 may, for example, be provided at a bottom-distal end of the sidewalls 8, i.e. free end of the sidewalls 8.

Provision is made to integrate the shell 2 with a damping device, generally designated by reference numeral 9 which includes damping elements in the form of a plurality of projections 10. It is readily apparent that the projections 10 are arranged in spaced-apart relation and extend from the bottom 7 of the shell 2. The projections 10 are also arranged at a distance to the sidewalls 8. The projections 10 have longitudinal center axes in parallel relation and extend at an angle in relation to the sidewalls 8. The angle is hereby greater than 0° and less than 180°. This can be realized, for example, by configuring the sidewalls 8 such as to extend slantingly or tilt to the outside away from the bottom 7 and thus with increasing distance from the opposite sidewall 8.

The projections 10 are formed together with the shell 2 during injection molding of the shell 2. The projections 10 are formed hereby in an off-tool manner, i.e. the projections 10 can easily be demolded from the injection mold 3. As a result, the fluid container 1 can be produced in a simple and cost-effective manner, because there is no longer any need for the provision of a separate damping device.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of producing a fluid container for a motor vehicle, comprising:
    injection molding at least two shaped shells each formed as a unitary, single-laver component, each of the shells forming both an interior surface and an exterior surface of the fluid container, each of the shells having a single planar bottom and sidewalls extending from the bottom at an angle in relation to the bottom away from the bottom and a plurality of projections in spaced-apart relation to one another and to the sidewalls, with the plurality of projections being injection-molded off-tool; and
    connecting the at least two shells.

2. The method of claim 1, wherein the projections are formed at a height which is smaller than a height of the shells.

3. The method of claim 1, wherein the projections are formed to extend directly from the bottoms of shells.

4. The method of claim 1, further comprising injection molding of the shells with a plurality of projections, with all of the projections of the one of the shells disposed in spaced-apart relation to all of the projections of the other of the shells.

5. The method of claim 1, further comprising injection molding of the shells with the projections of the one of the shells disposed in alignment with the projections of the other of the shells.

6. The method of claim 1, further comprising injection molding one of the shells with a plurality of the projections formed to engage between the projections of the other of the shells.

7. The method of claim 1, further comprising injection molding one of the shells with a plurality of projections defined by longitudinal center axes in offset relationship to longitudinal center axes defined by the projections of the other of the shells.

8. The method of claim 1, wherein the projections extend in parallel relationship.

9. The method of claim 1, wherein the projections have a round, a polygonal cross section, or a rectangular cross section.

10. The method of claim 1, wherein the projections are formed as cylinders or webs.

11. The method of claim 1, wherein the sidewalls are formed so as to extend at an angle in relation to the projections.

12. A fluid container for a motor vehicle, said fluid container comprising:
    at least two shaped shells connected to one another and each formed as a unitary, single-layer component, each of the shells forming both an interior surface and an exterior surface of the fluid container, each of the shells having a single planar bottom and sidewalls extending from the bottom at an angle in relation to the bottom away from the bottom and a plurality of projections in spaced-apart relation to one another and to the sidewalls, with the plurality of projections being injection-molded off-tool.

13. The fluid container of claim 12, wherein the projections are defined by a height which is smaller than a height of the shells.

14. The fluid container of claim 12, wherein one of the shells has all of the projections in spaced-apart relation to all of the projections of the other of the shells.

15. The fluid container of claim 12, wherein one of the shells has a plurality of projections in alignment with the plurality of projections of the other of the shells.

16. The fluid container of claim 12, wherein one of the shells has a plurality of projections formed to engage between the plurality of projections of the other of the shells.

17. The fluid container of claim 12, wherein one of the shells has a plurality of projections defined by longitudinal center axes in offset relationship to longitudinal center axes defined by the plurality of projections of the other of the shells.

18. The fluid container of claim 12, wherein the projections extend in parallel relationship.

19. The fluid container of claim 12, wherein the projections have a round or polygonal cross section.

20. The fluid container of claim 12, wherein sidewalls extend at an angle in relation to the projections.

* * * * *